Dec. 13, 1960     H. E. HRUSKA     2,964,017
POWER STEERING MECHANISM
Filed Dec. 9, 1957     3 Sheets-Sheet 3

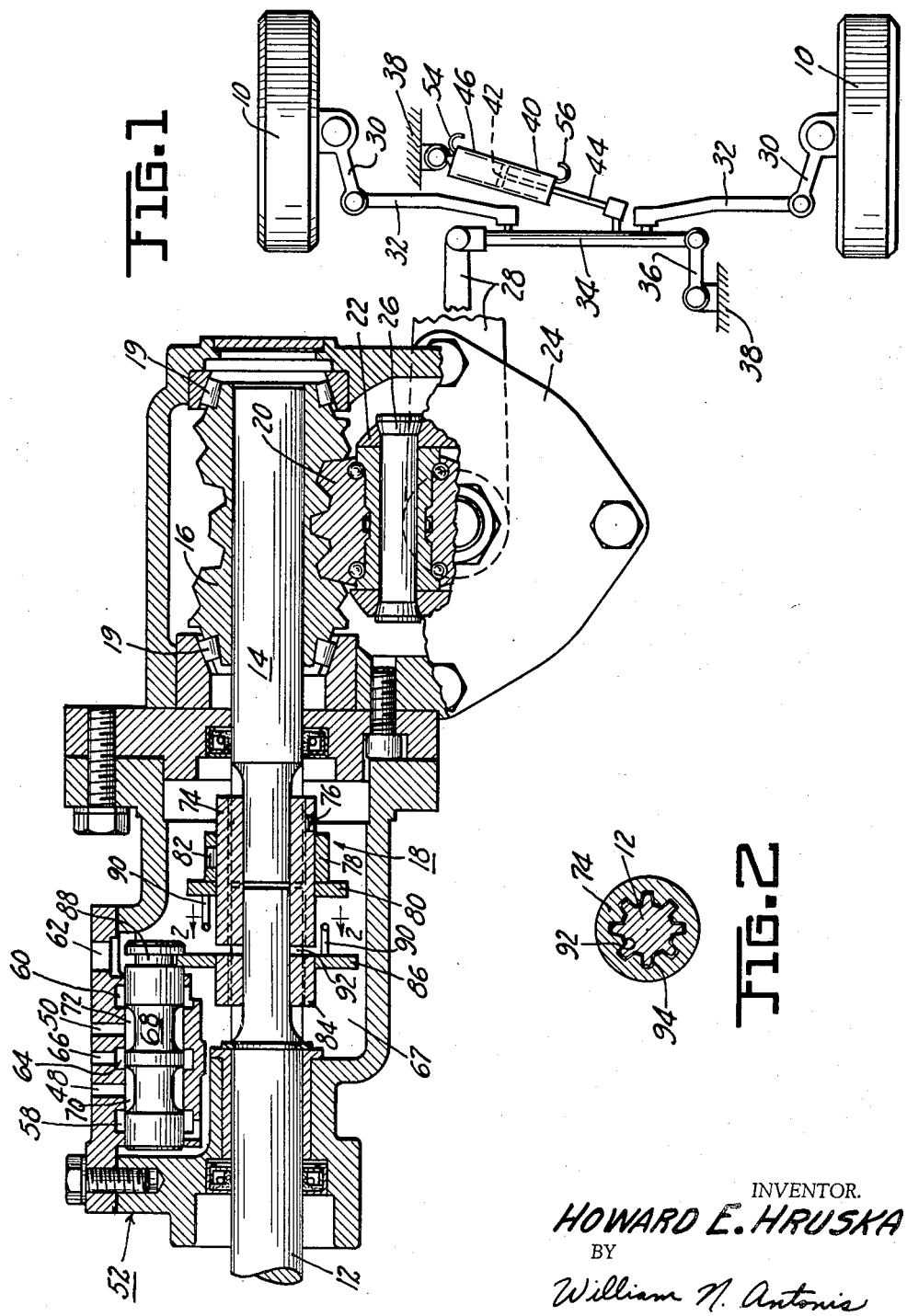

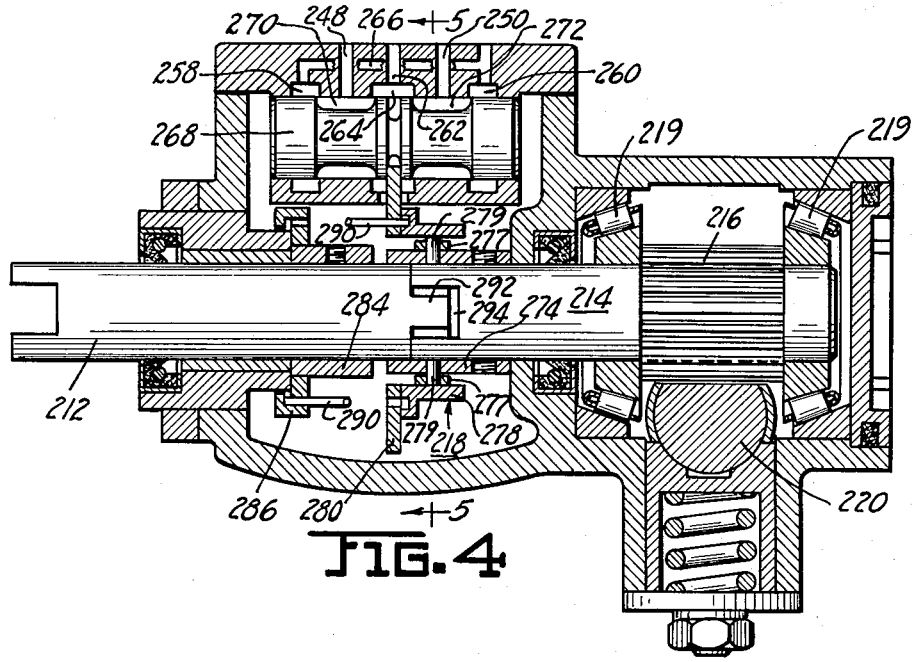
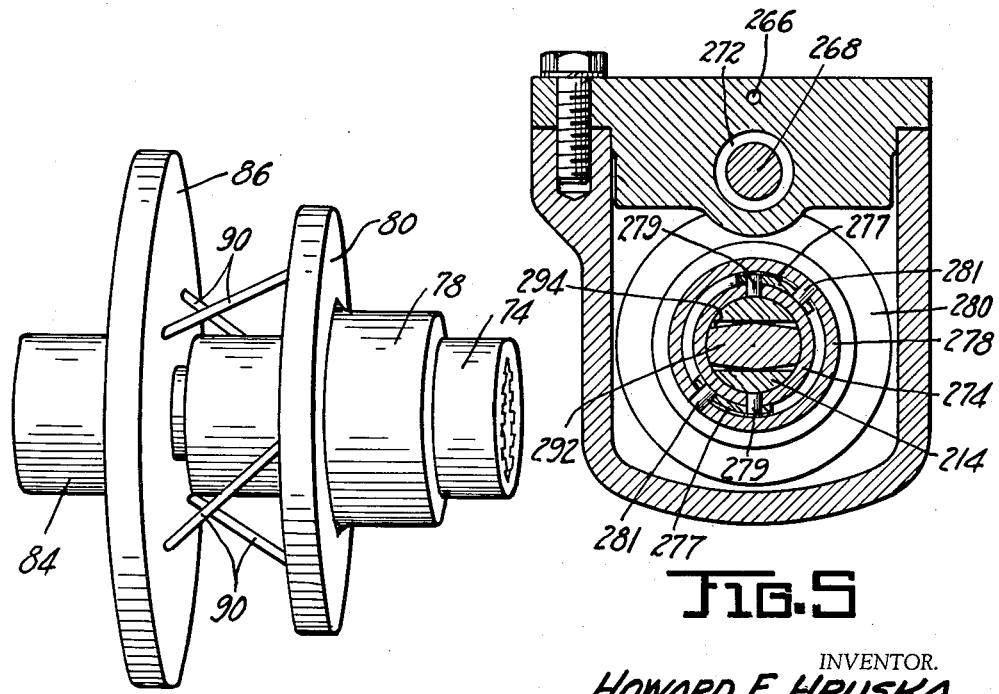

INVENTOR.
HOWARD E. HRUSKA
BY
William N. Antonis
ATTORNEY

United States Patent Office 2,964,017
Patented Dec. 13, 1960

2,964,017

POWER STEERING MECHANISM

Howard E. Hruska, South Bend, Ind., assignor to The Bendix Corporation, a corporation of Delaware Filed Dec. 9, 1957, Ser. No. 701,644

16 Claims. (Cl. 121—41)

This invention relates to power steering and more specifically to a combination valve actuating and "feel" transmitting mechanism therefor.

A primary object of this invention is to provide a simple power steering control mechanism which is located at the point where control is most desirable, namely between the steering gear and the steering wheel.

Another object of this invention is to provide a power steering mechanism wherein there is no axial movement of the steering shaft at any time, its movement being limited entirely to rotational motion.

A further object of this invention is to provide mechanical means for creating adequate synthetic "feel" through the entire steering range from parking to high speeds.

A still further and important object of this invention is to provide a power steering mechanism having novel means therein for simultaneously transmitting "feel" to the driver and for actuating the power steering control valve.

More specifically, it is an object of this invention to provide a power steering valve actuating means located on the steering column between the steering gear and the steering wheel, wherein said actuating means achieves movement through means of a plurality of angularly positioned spring struts which also transmit "feel" to the driver.

A further object of this invention is to provide means for manual steering in the event of power failure.

A still further object of this invention is to provide an inexpensive, strong, compact power steering mechanism which attains better steering characteristics than heretofore obtained by most other power steering units.

The above and other objects and features of the invention will become apparent from the following description of the mechanism taken in connection with the accompanying drawings which form a part of this specification and in which:

Figure 1 is a sectional view of a power steering unit, constructed in accordance with the present invention, which is shown in association with parts of a vehicle drawn schematically;

Figure 2 is a sectional view taken along line 2—2 Figure 1;

Figure 3 is an enlarged perspective view of a portion of the present invention;

Figure 4 is a sectional view of a power steering unit utilizing a rack and pinion steering gear in conjunction with another embodiment of my invention;

Figure 5 is a sectional view taken along line 5—5 of Figure 4;

Figure 6:
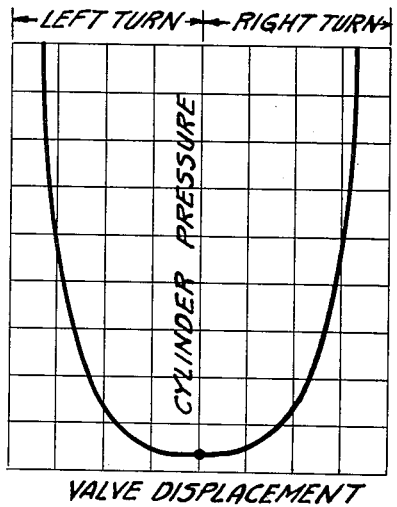
Figure 6 is a graph which shows the valve displacement-cylinder pressure curve for the disclosed power steering mechanism.

Referring to Figure 1, the reference numeral 10 designates the front wheels of a vehicle to be steered by rotation of a steering wheel (not shown) which is connected to steering shaft 12. A shaft section 14, having a worm gear 16 of the hour glass type mounted on the end thereof, is drivably connected to the steering shaft 12 by means of a control assembly indicated generally by the numeral 18. The shaft section 14 is held against axial displacement by thrust bearings 19 located at each end of the worm. A roller sector gear 20 is arranged in meshing relationship with the worm gear and is carried by one end of a rock shaft 22 which is properly journaled in housing 24. The roller sector gear 20 is rotatably carried on a pivot pin 26 suitably supported at one end of the rock shaft 22. A pitman arm 28 is connected to the rock shaft 22 and to the spindle arms 30 of the wheels 10 through a steering linkage assembly which includes tie rods 32, a cross tie rod 34, and an idler arm 36 suitably pivoted at one end to the vehicle frame 38.

The hydraulic system of the steering gear includes a fluid motor 40 which is connected between the cross tie rod 34 and the vehicle frame 38. The fluid motor includes a piston 42, a piston rod 44 suitably attached to the cross tie rod 34, and a cylinder 46 connected to the vehicle frame 38. The piston 42 divides the cylinder 46 into opposed chambers constantly communicating respectively with cylinder ports 48 and 50 of valve 52, via conduits 54 and 56. The valve is of conventional construction and includes two grooves 58 and 60 in the valve body which communicate with a reservoir (not shown) via return port 62, and a third groove 64 intermediate grooves 58 and 60 which communicates with a pump (not shown) via inlet port 66. Communication between grooves 58 and 60 and the return port 62 is by way of chamber 67 which is normally filled with fluid. The valve spool 68 is provided with two grooves 70 and 72 which communicate with cylinder ports 48 and 50 respectively and which overlap the grooves in the valve body to provide open passages through the valve when the spool is in neutral position.

Valve actuation is provided through means of the control assembly 18, said assembly including a sleeve 74 which is rigidly connected to shaft section 14 by means such as set screw 76, and a sleeve 78 having a flange 80 suitably connected thereto, said sleeve and flange being rigidly connected to sleeve 74 by means such as set screw 82. Another sleeve 84 is slidably connected to the steering shaft 12 and has a flange 86 suitably attached thereto. The flange 86 is positioned in groove 88 of spool 68 for moving the spool to the right or left, as shall subsequently be explained. A plurality of evenly distributed spring struts 90, each having one end rigidly connected to flange 80 and the other end to flange 86, are angularly positioned (preferably at 45° angles) with respect to the axis of the steering shaft 12 and shaft section 14, and with respect to the faces of the flanges 80 and 86, as is more clearly shown in Figure 3. It should be pointed out that the acute angle formed by each spring strut 90 with the axis of steering shaft 12 and shaft section 14 will be the complement of the acute angle formed by each spring strut with each of the faces of the flanges 80 and 86, which faces are perpendicular to the above mentioned axis. In other words, the two acute angles will be complementary or equal to 90°. Splines 92 formed on the end of steering shaft 12 permit sleeve 84 and connected flange 86 to slide axially along the shaft and also permit limited relative movement between the steering shaft 12 and shaft section 14, since the spline grooves 94 in sleeve 74 are wider than the splines on shaft 12 as shown in the sectional view of Figure 2.

Figure 7:
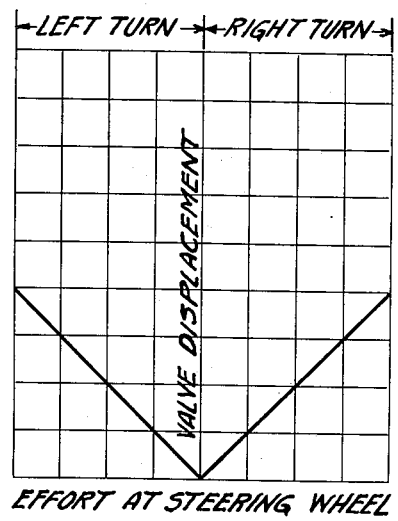
Figure 7 is a graph which shows the linear relationship between effort at the steering wheel and valve displacement resulting through use of the disclosed mechanism.

The operation of my steering mechanism is as follows: Upon initial turning of steering shaft 12, a certain amount of steering force is transmitted directly to shaft section 14 through deformable spring struts 90 of control assembly 18. These struts, which begin deflecting upon any slight initial rotational movement of steering shaft 12, are capable of transmitting rotational forces from the steering shaft 12 to shaft section 14 in proportion to the degree of their deflection or deformation. Any amount of deformation of the struts will result in immediate axial movement of flange 86 which is connected to valve spool 68, but no power boost will result until axial movement of the flange has moved the valve spool to a cut-off position which will result in increased pressurization of one or the other of the power cylinder chambers. (Note the graphs of Figures 6 and 7.) In other words, since the spring struts 90 are angularly positioned with respect to the faces of flanges 80 and 86, so that acute angles are formed therewith, rotational movement of the steering shaft in a clockwise direction (looking at Figures 1 and 3 from the left), or in the direction in which relative rotation between the two flanges tends to reduce said acute angles, will cause the sleeve 84 and flange 86 to move immediately toward the flange 80. Such movement will cause valve spool 68 to move from its neutral position to the right until it reaches a cut-off position at which time increased fluid pressure will be directed from the inlet port 66 to the appropriate end of power cylinder 40 via cylinder port 48. Rotational movement of the steering shaft in a counterclockwise direction, or in the direction in which relative rotation between the two flanges tends to enlarge the mentioned acute angles, will cause sleeve 84 and flange 86 to move away from the flange 80. Such movement, which causes movement of the valve spool to the left, results in the directing of increased fluid pressure from inlet port 66 to the opposite end of power cylinder 40 via cylinder port 50. Note that Figure 6 shows a slight amount of cylinder pressure even without any valve displacement. This is due to back pressure resulting from flow in the hydraulic system. When the valve is in neutral position the piston will also be in a neutral state and will not move until the differential pressure acting on opposite sides thereof causes such movement.

By using angularly positioned spring struts 90, as I have disclosed, it is possible not only to achieve a direct actuation of a power steering control valve through rotation of the steering shaft, but to also transmit to the driver a more accurate and true "feel" of the road. Thus, in the disclosed power steering mechanism a hydraulic assist is provided only at such times as when the resistance to movement of the steering linkage exceeds the rotational force which can be transmitted by the spring struts without valve closure, that is, without the valve spool being moved to a cut-off position which will result in pressurization of one side or the other of the power cylinder. If the steering linkage does not exert enough resistance to deform the struts sufficiently to cause movement of the spool to a cut-off position, then only the manually exerted force at the steering wheel will be necessary to cause movement of the steering linkage, and no hydraulic assist will result. In this manner a truer and more adequate synthetic "feel" is transmitted to the driver from the very beginning and under all driving conditions. It should be noted that in the event of power failure, manual steering is available once the splines 90 of steering shaft 12 have made contact with the spline groove walls of sleeve 74.

Figure 8:
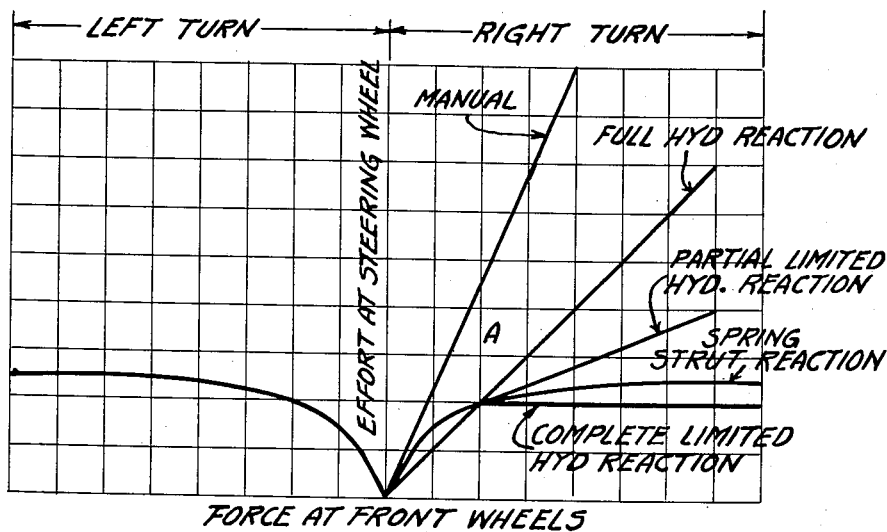
Figure 8 is a graph which shows the relationship of steering wheel effort vs. force at the front wheels for various types of power steering systems.

By referring to the graph of Figure 8, where effort at the steering wheel is plotted against force at the front wheels, the type of "feel" created by my mechanism can be readily compared with that of manual steering and power steering systems utilizing full hydraulic reaction, partial limited hydraulic reaction (as disclosed in H. B. Schultz's Application Serial No. 513,834, now Patent No. 2,893,505), and complete limited hydraulic reaction (as disclosed in S. I. MacDuff's Application Serial No. 457,836, now Patent No. 2,930,361). The full hydraulic reaction curve shown on the graph shows the effect of using a control valve having reaction areas subject to variable pressures which are not limited from acting thereagainst in any manner, while the complete limited hydraulic reaction curve shown illustrates the types of steering obtained by use of a control valve wherein hydraulic reaction is completely cut out after a predetermined pressure has been reached. The partial limited hydraulic reaction curve characteristics are obtained by use of a valve having dual hydraulic reaction areas, both of which oppose movement of the valve spool for a given direction of movement, wherein one of the reaction areas has the pressure acting thereagainst limited to a maximum predetermined value, while the pressure acting on the other reaction area is not limited at all. Note that the curve obtained through use of my spring struts 90 starts along the manual reaction curve and then falls somewhat between the complete limited reaction and partial limited reaction curves, retaining the principal "feel" advantages of all three curves, plus the further advantage of having continuously smooth "feel." The abrupt change in "feel" which results at point A of the graph when reaction limiting occurs is completely obviated by use of my mechanism.

Figure 4 shows an alternate arrangement of my actuating mechanism in association with a rack and pinion steering gear. In this figure like parts are designated by like numerals plus 200. Referring to Figure 4, it will be seen that steering shaft 212 is drivably connected to shaft section 214 by means of control assembly 218. On the end of shaft section 214 there is formed a pinion gear 216 which meshes with a rack 220, the rack being suitably connected to the steering linkage. Thrust bearings 219 prevent axial displacement of shaft section 214. The hydraulic system of the steering gear shown in Figure 4 is essentially the same as that shown in Figure 1, except that in the Figure 4 arrangement the two outer grooves in the valve housing, namely 258 and 260, communicate with the pump via inlet port 266, while the center groove 264 in the housing communicates with the reservoir via return port 262. The grooves 270 and 272 in valve spool 268 communicate with a power cylinder via cylinder ports 248 and 250, as previously described with respect to Figure 1. The control assembly 218 differs from the control assembly of Figure 1 in the following respects. A sleeve 284 having a flange 286 suitably connected thereto is rigidly fixed to the steering shaft 212 by means such as a set screw. Sleeve 274 is rigidly fixed to shaft section 214 by similar means. In order to permit relative movement between flange 286 and 280, flange 280 is movably connected to shaft section 214 by means of an outer sleeve 278 which is fixedly connected to flange 280, links 277, and pins 279 and 281. (See Figure 5.) Pins 281 are press fit in the outer sleeve 278 and loose fit in the links 277. Pins 279 are loose fit with respect to both the inner sleeve 274 and the links 277. In order to permit movement of the links between the inner and outer sleeves a small clearance is provided therebetween. A plurality of spring struts 290 are angularly positioned between the flanges 280 and 286 in the manner previously described with respect to Figure 1. Under normal steering gear arrangements it is preferred that these struts be positioned at substantially 45° angles in order to achieve equal reaction or "feel" for either direction of turning. Under unusual circumstances it may be desirable to position the spring struts at angles other than 45°. Relative movement between steering shaft 212 and shaft section 214, instead of being provided by splined means as in Figure 1 is provided by a tongue and groove arrangement, as shown in the sectional view of Figure 5, wherein the tongue 292 is formed on the end of steering shaft 212 and the tongue groove 294 is formed on the end of shaft section 214. In order to attain a more compact unit the valve spool 268 is actuated from the middle thereof by flange 280.

Operation of this steering mechanism is the same as previously described except that in this arrangement the movable flange 280 is movably connected to shaft section 214 and movement relative to the shaft section is achieved by means of links 277 instead of splines. Upon rotation of steering shaft 212, the flange 280 and sleeve 278 will move axially with respect to sleeve 274, said sleeve 274 being fixedly connected to shaft section 214. Such movement is permitted by links 277 which are pivotally connected to sleeves 274 and 278 by pins 279 and 281, said links being the only connection between the sleeves. In the event of power failure manual steering is provided by means of the tapered tongue and groove arrangement. Thus, once the opposed tapered faces of tongue 292 make contact with the walls of the groove 294, manual steering will be possible.

From the foregoing it will be apparent that I have devised a power steering mechanism which is compact and may be easily constructed and assembled in operating position. The control valve and valve actuator are located between the steering gear and the steering wheel, the most desirable location for the hydraulic control mechanism. The steering gear does not partake of any axial motion, the only axial motion occurring in the valve actuating mechanism. Furthermore, by means for simultaneously transmitting "feel" and actuating the power steering control valve is an extremely, inexpensive, simple, and more effective mechanism than has heretofore been known.

Although my invention has been described in connection with certain specific embodiments, the principles are susceptible of numerous other applications that will readily occur to persons skilled in the art.

Having thus described the various features of my invention what I claim as new and desire to secure by Letters Patent is:

1. In a power steering mechanism having a power cylinder and a valve for controlling the operation of said power cylinder, a valve actuating mechanism comprising an operating shaft, a driven shaft, a first member rigidly connected to one of said shafts, a second member operatively connected to the other of said shafts and to said valve, said second member being axially movable relative to said shafts and restricted against rotational movement relative to the shaft to which it is operatively connected, and at least one resilient element connected to said first and second members for opposing rotation of said operating shaft and for urging said second member to move toward said first member upon rotation of said operating shaft in one direction and away from said first member upon rotation of said operating shaft in the opposite direction.

2. In a servomotor, driven means, a hydraulic ram drivingly connected to said driven means, a valve for controlling the operation of said ram, an operating shaft, a driven shaft coaxial with said operating shaft and connected to said driven means, a lost motion connection between said operating shaft and said driven shaft, a first member rigidly connected to one of said shafts, a second member operatively connected to the other of said shafts and to said valve, said second member being axially movable relative to said shafts and restricted against rotational movement relative to the shaft to which it is operatively connected, and at least one resilient deformable element connected to said first and second members for urging said second member to move toward or away from said first member depending upon the direction of rotation of said operating shaft, said resilient element opposing rotation of said operating shaft in both directions.

3. A power steering mechanism comprising steering means, a steering shaft, a driven shaft coaxial with said steering shaft and connected to said steering means, means between said steering shaft and said driven shaft for permitting limited relative rotary motion therebetween, a first member rigidly connected to one of said shafts, a second member operatively connected to the other of said shafts, said second member being axially movable relative to said shafts and restricted against rotational movement relative to the shaft to which it is operatively connected, at least one resilient element angularly disposed with respect to the axes of said shafts and connected to said first and second members for opposing rotation of said steering shaft and for urging said second member to move toward said first member when said steering shaft is rotated in one direction and away from said first member when said steering shaft is rotated in the opposite direction, and power means responsive to movement of said second member for applying power to said steering means.

4. A power steering mechanism comprising steering means, a steering shaft, a driven shaft coaxial with said steering shaft and connected to said steering means, means between said steering shaft and said driven shaft for permitting limited relative rotary motion therebetween, a first member rigidly connected to one of said shafts, a second member operatively connected to the other of said shafts, said second member being axially movable relative to said shafts and restricted against rotational movement relative to the shaft to which it is operatively connected, means for moving said second member toward said first member when said steering shaft is rotated in one direction and away from said first member when said steering shaft is rotated in the opposite direction, said last named means including a plurality of shaft-like spring struts having longitudinally extending and oppositely disposed ends, each of said struts having one end connected to said first member and the other end to said second member, and power means responsive to movement of said second member for applying power to said steering means.

5. A power steering mechanism as defined in claim 4 wherein said spring struts are angularly positioned with respect to the axes of said steering and driven shafts at angles less than 90°.

6. A power steering mechanism as defined in claim 4 wherein said spring struts are positioned at substantially 45° angles with respect to the axes of said steering and driven shafts.

7. In a power steering mechanism having steering means, a hydraulic motor connected to said steering means, and valve means for controlling the operation of said hydraulic motor, a mechanism for actuating said valve means comprising a steering shaft, a driven shaft coaxial with said steering shaft and connected to said steering means, a first member rigidly connected to one of said shafts, a second member operatively connected to the other of said shafts and to said valve means for actuation thereof, said second member being axially movable relative to said shafts and restricted against rotational movement relative to the shaft to which it is operatively connected, a plurality of spring struts having only two ends, each of said struts having one end connected to said first member and the other end to said second member for effecting relative movement between said first and second members, said struts each forming an acute angle with respect to the axes of said steering and driven shafts, said second member being drawn toward said first member by said struts upon rotation of said steering shaft in a direction tending to increase each of said acute angles and forced away from said first member by said struts upon rotation of said steering shaft in a direction tending to decrease each of said acute angles.

8. In a power steering mechanism having steering means, a power cylinder connected to said steering means, and a valve for controlling the operation of said power cylinder, a valve actuating mechanism comprising a steering shaft, a driven shaft coaxial with said steering shaft and connected to said steering means, a first member rigidly connected to one of said shafts, a second member operatively connected to the other of said shafts and to said valve for actuation thereof, said second member being axially movable relative to said shafts and restricted against rotational movement relative to the shaft to which it is operatively connected, a plurality of spring struts for opposing rotation of said steering shaft and for moving said second member toward said first member when said steering shaft is rotated in one direction and away from said first member when said steering shaft is rotated in the opposite direction, said spring struts being positioned at substantially 45° angles with respect to the axes of said steering and driven shafts and each having one end rigidly connected to said first member and the other end rigidly connected to said second member.

9. In a power steering mechanism having a power cylinder and a valve for controlling the operation of said power cylinder, a valve actuating mechanism comprising an operating shaft, a driven shaft, a first sleeve member rigidly connected to said driven shaft, a second sleeve member operatively connected to said operating shaft and to said valve, said second member being axially movable relative to said shafts and restricted against rotational movement relative to said operating shaft, and at least one resilient element connected to said first and second sleeve members for opposing rotation of said operating shaft and for urging said second sleeve member to move toward said first sleeve member upon rotation of said operating shaft in one direction and away from said first sleeve member upon rotation of said operating shaft in the opposite direction.

10. A power steering mechanism comprising steering means, a steering shaft, a driven shaft coaxial with said steering shaft and connected to said steering means, means between said steering shaft and said driven shaft for permitting limited relative rotary motion therebetween, a first member rigidly connected to said driven shaft, a second member operatively connected to said steering shaft, said second member being axially movable relative to said shafts and restricted against rotational movement relative to said steering shaft, at least one resilient element angularly disposed with respect to the axes of said shafts and connected to said first and second members for opposing rotation of said steering shaft and for urging said second member to move toward or away from said first member depending upon the direction of rotation of said steering shaft, and power means responsive to movement of said second member for applying power to said steering means.

11. In a servomotor, driven means, a hydraulic motor drivingly connected to said driven means, a valve for controlling the operation of said hydraulic motor, an operating shaft, a driven shaft coaxial with said operating shaft and connected to said driven means, a lost motion connection between said operating shaft and said driven shaft, a first member rigidly connected to said driven shaft, a second member operatively connected to said operating shaft through said lost motion connection and to said valve, said second member being axially movable relative to said shafts and restricted against rotational movement relative to said operating shaft, and at least one resilient deformable element connected to said first and second members for urging said second member to move toward or away from said first member depending upon the direction of rotation of said operating shaft, said resilient element opposing rotation of said operating shaft in both directions.

12. In a power steering mechanism having steering means, a power cylinder connected to said steering means, and a valve for controlling the operation of said power cylinder, a valve actuating mechanism comprising a steering shaft, a driven shaft coaxial with said steering shaft and connected to said steering means, first and second members, a first connection rigidly connecting said first member to one of said shafts, a second connection slidably connecting said second member to the other of said shafts and to said valve for actuation thereof, said second connection including means for restricting relative rotative motion between said second member and the other of said shafts and for permitting said second member to slide axially along the other of said shafts, and a plurality of spring struts for opposing rotation of said steering shaft and for moving said second member toward said first member when said steering shaft is rotated in one direction and away from said first member when said steering shaft is rotated in the opposite direction, said spring struts being positioned at substantially 45° angles with respect to the axes of said steering and driven shafts and each having one end rigidly connected to said first member and the other end rigidly connected to said second member.

13. In a servomotor, driven means, a hydraulic motor drivingly connected to said driven means, a valve for controlling the operation of said hydraulic motor, an operating shaft, a driven shaft coaxial with said operating shaft and connected to said driven means, a lost motion connection between said operating shaft and said driven shaft, a first member rigidly connected to said operating shaft, a second member movably connected to said driven shaft and to said valve, said connection between said second member and said driven shaft including a first sleeve rigidly connected to said driven shaft, a second sleeve rigidly connected to said second member, and linking means pivotally connected to said first and second sleeves for restricting relative rotative movement between said sleeves but permitting axial movement therebetween, and at least one resilient element for moving said second member toward said first member when said operating shaft is rotated in one direction and away from said first member when said steering shaft is rotated in the opposite direction, said resilient element opposing rotation of said operating shaft in both directions.

14. In a power steering mechanism having steering means, a power cylinder connected to said steering means, and a valve for controlling the operation of said power cylinder, a valve actuating mechanism comprising a steering shaft, a driven shaft coaxial with said steering shaft and connected to said steering means, first and second members, a first connection rigidly connecting said first member to one of said shafts, a second connection movably connecting said second member to the other of said shafts and to said valve for actuation thereof, said second connection including a first element rigidly connected to the other of said shafts, a second element rigidly connected to said second member, and linking means pivotally connected to said first and second elements for restricting relative rotative movement between said elements but permitting axial movement therebetween, a plurality of spring struts for opposing rotation of said steering shaft and for moving said second member toward said first member when said steering shaft is rotated in one direction and away from said first member when said steering shaft is rotated in the opposite direction, said spring struts being positioned at substantially 45° angles with respect to the axes of said steering and driven shafts, each of said struts having one end rigidly connected to said first member and the other end rigidly connected to said second member.

15. In a power steering mechanism having a power cylinder and a valve for controlling the operation of said power cylinder, a valve actuating mechanism comprising an operating shaft, a driven shaft, a member operatively connected to one of said shafts and to said valve, said member being axially movable with respect to said shafts and restricted against rotational movement relative to the shaft to which it is operatively connected, and at least one resilient element operatively connected to said member and to the other of said shafts for simultaneously opposing rotation of said operating shaft and causing axial movement of said member in one direction upon clockwise rotation of said operating shaft and in the opposite direction upon counter-clockwise rotation of said operating shaft.

16. In a power steering mechanism having steering means, a power cylinder connected to said steering means, and a valve for controlling the operation of said power cylinder, a valve actuating mechanism comprising a steering shaft, a driven shaft coaxial with said steering shaft and connected to said steering means, a member, operatively connected to one of said shafts and to said valve for actuation thereof, said member being axially movable with respect to said shafts and restricted against rotational movement relative to the shaft to which it is operatively connected, and a plurality of spring struts for simultaneously opposing rotation of said steering shaft and causing axial movement of said member in one direction upon clockwise rotation of said steering shaft and in the opposite direction upon counter-clockwise rotation of said steering shaft, said spring struts being angularly positioned with respect to the axes of said steering and driven shafts at angles less than 90°, each of said struts having one end operatively connected to said member and the other end operatively connected to the other of said shafts.

References Cited in the file of this patent

UNITED STATES PATENTS 2,362,930     Robbins _____ Nov. 14, 1944